United States Patent
Yang et al.

(10) Patent No.: US 11,940,586 B2
(45) Date of Patent: Mar. 26, 2024

(54) NOISE ELIMINATION OR REDUCTION IN DRILLING OPERATION MEASUREMENTS USING MACHINE LEARNING

(71) Applicant: Halliburton Energy Services, Inc., Houston, TX (US)

(72) Inventors: Jie Yang, Houston, TX (US); Songhua Chen, Katy, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 17/517,234

(22) Filed: Nov. 2, 2021

(65) Prior Publication Data

US 2022/0187489 A1 Jun. 16, 2022

Related U.S. Application Data

(60) Provisional application No. 63/126,181, filed on Dec. 16, 2020.

(51) Int. Cl.
| | | |
|---|---|---|
| *G01V 3/14* | (2006.01) | |
| *E21B 47/12* | (2012.01) | |
| *G01P 15/00* | (2006.01) | |
| *G05B 13/02* | (2006.01) | |

(52) U.S. Cl.
CPC ............... *G01V 3/14* (2013.01); *E21B 47/12* (2013.01); *G01P 15/00* (2013.01); *G05B 13/0265* (2013.01); *E21B 2200/20* (2020.05)

(58) Field of Classification Search
CPC .. G01V 3/14; G01V 3/32; E21B 47/12; E21B 2200/20; E21B 2200/22; G01P 15/00; G05B 13/0265; G06F 30/27; G06N 20/00
See application file for complete search history.

(56) References Cited

U.S. PATENT DOCUMENTS

| | | | |
|---|---|---|---|
| 6,370,082 B1* | 4/2002 | Gardner | E21B 47/16 340/854.4 |
| 2008/0068211 A1* | 3/2008 | Aiello | E21B 47/13 340/854.6 |
| 2013/0124095 A1* | 5/2013 | Sugiura | E21B 44/00 702/9 |

(Continued)

FOREIGN PATENT DOCUMENTS

| | | |
|---|---|---|
| CA | 3090956 A1 | 11/2019 |
| CN | 111308560 A | 6/2020 |

OTHER PUBLICATIONS

Saudi Arabian Patent Application No. 121430338, Office Action dated Oct. 4, 2023, 14 pages.

*Primary Examiner* — Catherine T. Rastovski
*Assistant Examiner* — Yossef Korang-Beheshti
(74) *Attorney, Agent, or Firm* — Kilpatrick Townsend & Stockton LLP

(57) ABSTRACT

Noise in drilling operation measurements can be eliminated or reduced using machine learning. For example, a system described herein can receive one or more measured signals in a logging-while-drilling process for drilling a wellbore. The system can determine a coupling factor for noise in the one or more measured signals. The system can generate a corrected signal by removing the noise multiplied by the coupling factor from the one or more measured signals. The system can output the corrected signal for use in drilling operations in the wellbore.

20 Claims, 5 Drawing Sheets

(56) References Cited

U.S. PATENT DOCUMENTS

| | | | |
|---|---|---|---|
| 2015/0345287 A1* | 12/2015 | White | E21B 47/20 |
| | | | 367/83 |
| 2016/0290117 A1* | 10/2016 | Dykstra | E21B 44/06 |
| 2017/0235007 A1* | 8/2017 | Holtz | G01V 1/46 |
| | | | 175/24 |
| 2020/0063546 A1 | 2/2020 | Weideman et al. | |
| 2020/0190971 A1 | 6/2020 | Thiruvenkatanathan | |
| 2021/0231487 A1* | 7/2021 | Qu | G06N 3/126 |
| 2022/0090481 A1* | 3/2022 | Aljedaani | E21B 44/00 |

* cited by examiner

NOISE ELIMINATION OR REDUCTION IN DRILLING OPERATION MEASUREMENTS USING MACHINE LEARNING

CROSS REFERENCE TO RELATED APPLICATION

This claims priority to U.S. Provisional Application No. 63/126,181, filed Dec. 16, 2020 and titled "NOISE ELIMINATION OR REDUCTION IN DRILLING OPERATION MEASUREMENTS USING MACHINE LEARNING," the entirety of which is incorporated herein by reference.

TECHNICAL FIELD

The present disclosure relates generally to drilling operations in a wellbore, and, more particularly (although not necessarily exclusively), to eliminating or reducing noise in drilling operation measurements using machine learning.

BACKGROUND

Logging-while-drilling operations can involve measuring formation properties during a drilling phase for a wellbore. Formation properties can be measured using tools, such as wireline tools integrated into a bottom-hole assembly. An example of a tool used to measure formation properties is an NMR measurement sensor that can provide logging services to assist in identifying hydrocarbon-bearing zone, porosity, porosity partitions, and pore typing, and in defining fluid volumes for assessing reservoir quality, among other uses. Properties of a formation can be measured and used to make drilling decisions or to control drilling processes. Examples of properties of a formation can include porosity, a fraction of porosity corresponding to a certain range of NMR relaxation rate responses, and time-domain NMR response.

DETAILED DESCRIPTION

Figure 1:
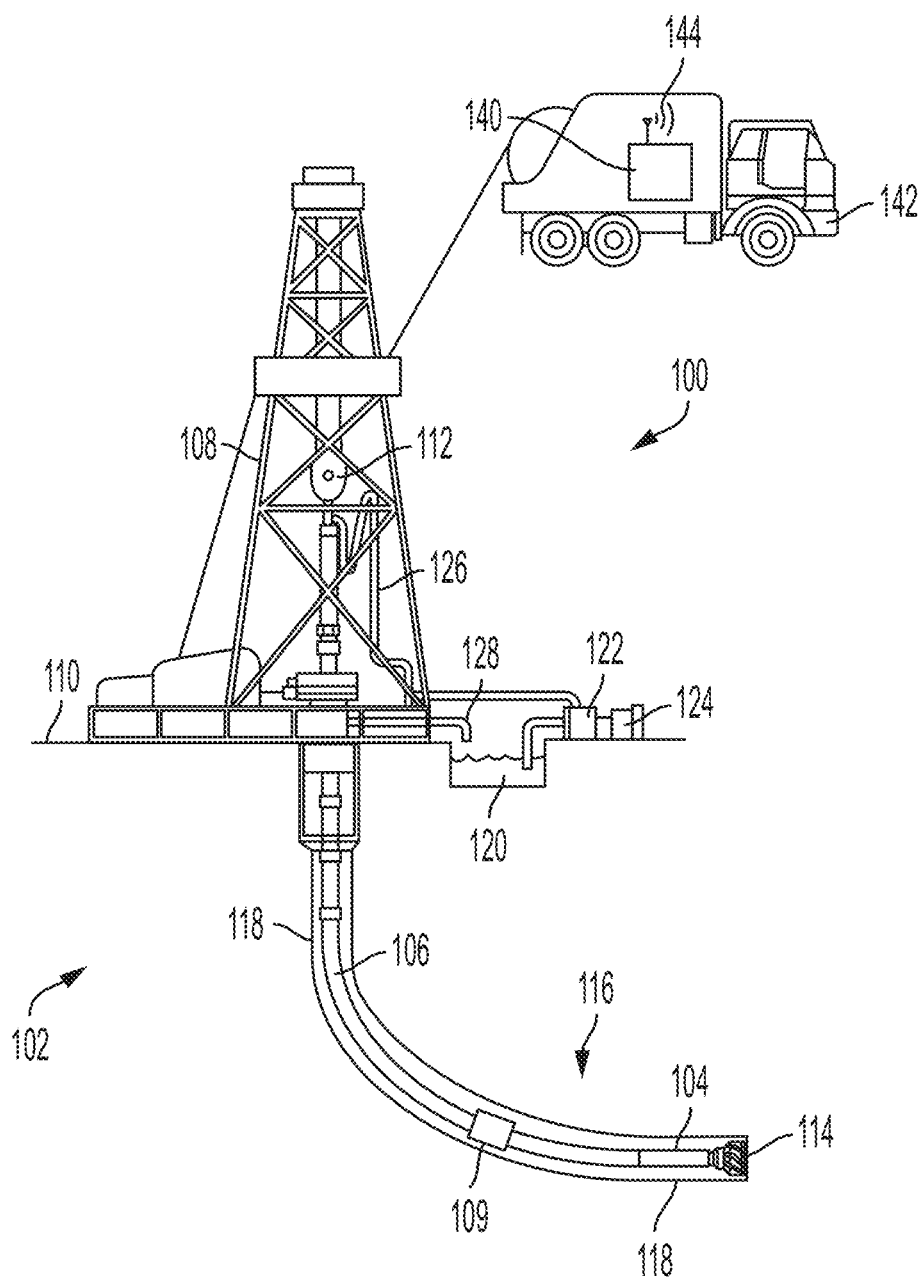
FIG. 1 is a cross-sectional view of a wellbore drilling system that can correct measured signals to remove noise according to one example of the present disclosure.

Certain aspects and features of the present disclosure relate to using machine learning models to eliminate or reduce noise in wellbore operation signals, such as nuclear magnetic resonance ("NMR") measurements. Machine learning can be used to determine a correlation between a measured signal and noise, such as vibration noise or motion noise, for improving signal quality. Signals from the NMR sensors with the NMR measurement data may be polluted with noise. And, an NMR signal may be very small or have a lower signal-to-noise ratio such that the noise can have a negative impact on extracting the NMR measurements. For example, noise that leaks into the measurements can be processed as part of the signal and cause challenges in analyzing the NMR measurements correctly. And, NMR tools may over-call or under-call formation porosities due to noise. Some aspects of the present disclosure can be applied to scenarios of vibration noise causing NMR measurements overcalling formation porosity, to vibration noise causing NMR measurements undercalling formation porosity, or to both in different logging intervals.

A machine-learning process can be applied to the signals to remove vibration-related noise, or other types of noise, from NMR signals. The machine-learning process can be applied in real-time or for post-processing of data. Formation signals are independent of vibration and movement, but a measured signal can include formation information and one or more types of noise, such as vibration-related noise or motion-related noise. For example, a computing device may determine that a measured signal includes the formation-related signal and a vibration-related signal multiplied by a coupling factor (which can be designated as alpha), in addition to other noise. The vibration-related signal can be represented by acceleration data that can be measured by an accelerometer or another type of device, for example, magnetometers, gyroscopes, acoustic sensors, etc. Alternatively or additionally, the computing device may determine that the measured signal includes the formation-related signal and a motion-related signal. The motion-related signal can be represented by slip-stick measurement data. The coupling factor (i.e., alpha) can be learned, using machine-learning techniques, from the relationship between the measured signal and the vibration signal or the motion signal. For example, the computing device can determine alpha by setting the correlation between (1) the vibration signal and (2) the measured signal minus alpha multiplied by the vibration signal to zero. After alpha is determined, the computing device can determine a vibration-corrected signal that is the measured signal minus alpha multiplied by the vibration signal. The vibration-corrected signal can be used to assess one or more formation properties and to make decisions on, or control, a drilling process.

In one example, a system includes a formation signal noise model that is trained using signals that mimic measured signals that have formation data and noise data included therein. At least some of the noise data may be known or artificially included. The trained model can be applied to measured signals received from measurement sensors in a drilling phase of a wellbore and used to correlate content of measured signals to determine alpha and remove noise-related components of the measured signals. The corrected signal can be outputted and used for controlling a drilling operation. When stationary data is available, the stationary data can be used to calibrate and adjust the model parameters to improve the corrected signal.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a cross-sectional view of a wellbore drilling system 100 that can correct measured signals to remove noise according to one example of the present disclosure.

A wellbore used to extract hydrocarbons may be created by drilling into a subterranean formation 102 using the drilling system 100. The drilling system 100 may include a bottom hole assembly (BHA) 104 positioned or otherwise arranged at the bottom of a drill string 106 extended into the subterranean formation 102 from a derrick 108 arranged at the surface 110. The derrick 108 includes a kelly 112 used to lower and raise the drill string 106. The BHA 104 may include a drill bit 114 operatively coupled to a tool string 116, which may be moved axially within a drilled wellbore 118 as attached to the drill string 106. Tool string 116 may include one or more sensors 109, for determining conditions in the wellbore. Sensors 109, such as NMR sensors, may be positioned on drilling equipment and sense formation properties or other types of properties about the drilling process. The sensors 109 can send signals to the surface 110 via a wired or wireless connection, and the sensors 109 may send real-time data relating to the drilling operation and formation to the surface 110. The combination of any support structure (in this example, derrick 108), any motors, electrical equipment, and support for the drill string and tool string may be referred to herein as a drilling arrangement.

During operation, the drill bit 114 penetrates the subterranean formation 102 to create the wellbore 118. The BHA 104 can provide control of the drill bit 114 as it advances into the subterranean formation 102. The combination of the BHA 104 and drill bit 114 can be referred to as a drilling tool. Fluid or "mud" from a mud tank 120 may be pumped downhole using a mud pump 122 powered by an adjacent power source, such as a prime mover or motor 124. The mud may be pumped from the mud tank 120, through a stand pipe 126, which feeds the mud into the drill string 106 and conveys the same to the drill bit 114. The mud exits one or more nozzles (not shown) arranged in the drill bit 114 and in the process cools the drill bit 114. After exiting the drill bit 114, the mud circulates back to the surface 110 via the annulus defined between the wellbore 118 and the drill string 106, and hole cleaning can occur which involves returning the drill cuttings and debris to the surface. The cuttings and mud mixture are passed through a flow line 128 and are processed such that a cleaned mud is returned down hole through the stand pipe 126 once again.

The drilling arrangement and any sensors (through the drilling arrangement or directly) can be connected to a computing device 140. In FIG. 1, the computing device 140 is illustrated as being deployed in a work vehicle 142; however, a computing device to receive data from sensors and to control drill bit 114 can be permanently installed with the drilling arrangement, be hand-held, or be remotely located. Although one computing device 140 is depicted in FIG. 1, in other examples, more than one computing device can be used, and together, the multiple computing devices can perform operations, such as those described in the present disclosure.

The computing device 140 can include a processor interfaced with other hardware via a bus. A memory, which can include any suitable tangible (and non-transitory) computer-readable medium, such as random-access memory ("RAM"), read-only memory ("ROM"), electrically erasable and programmable read-only memory ("EEPROM"), or the like, can embody program components that configure operation of the computing device 140. In some aspects, the computing device 140 can include input/output interface components (e.g., a display, printer, keyboard, touch-sensitive surface, and mouse) and additional storage.

The computing device 140 can include a communication device 144. The communication device 144 can represent one or more of any components that facilitate a network connection. In the example shown in FIG. 1, the communication devices 144 are wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). In some examples, the communication devices 144 can use acoustic waves, surface waves, vibrations, optical waves, or induction (e.g., magnetic induction) for engaging in wireless communications. In other examples, the communication device 144 can be wired and can include interfaces such as Ethernet, USB, IEEE 1394, or a fiber optic interface. In an example with at least one other computing device, the computing device 140 can receive wired or wireless communications from the other computing device and perform one or more tasks based on the communications. For example, the computing device 140 can be used to apply a machine-learning process for determining a coupling factor (i.e., alpha) included in a measured signal and to generate a corrected signal with reduced or removed noise, using the determined coupling factor. In some examples, the coupling factor may be a constant value or may vary with depth.

Figure 2:
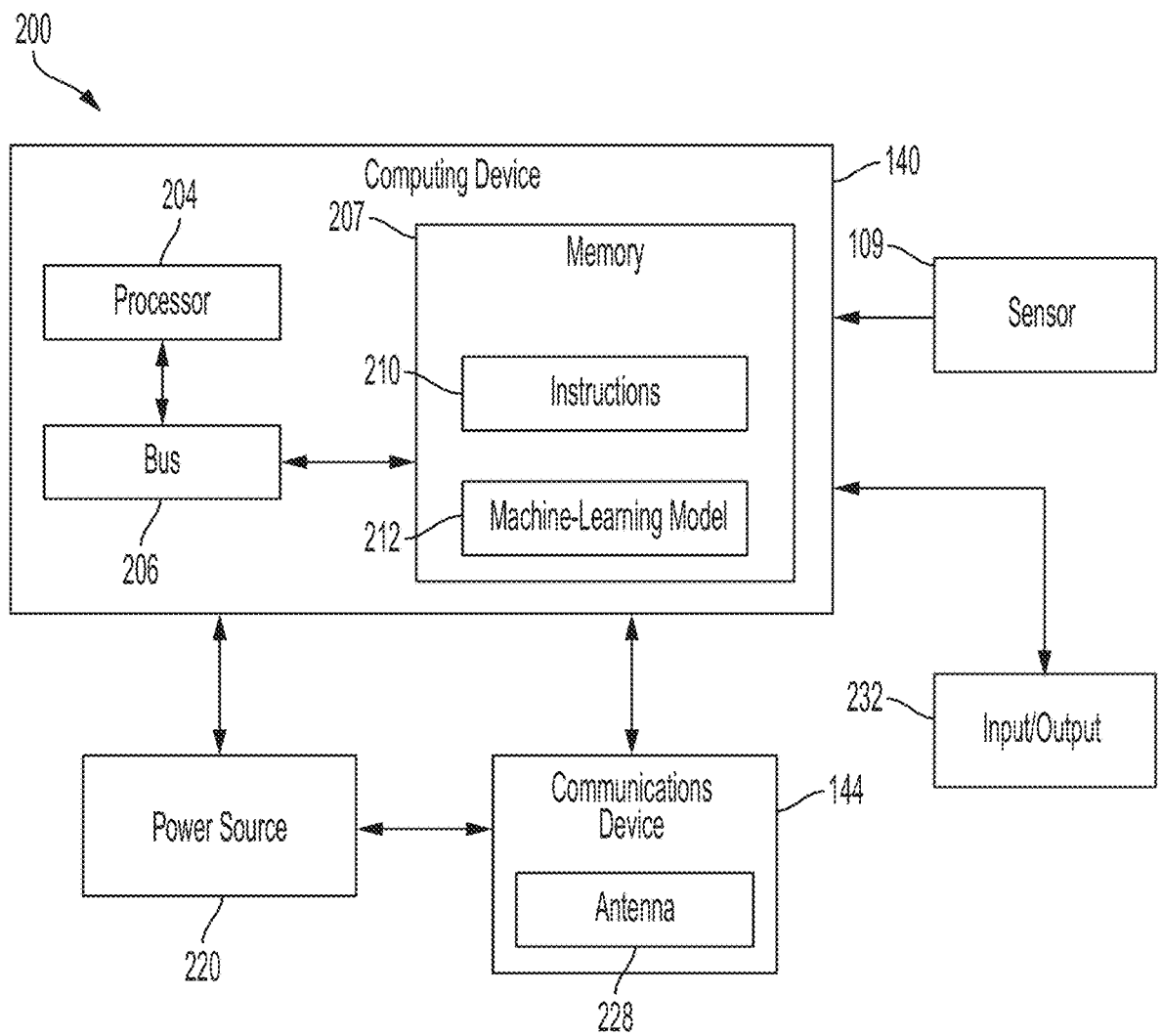
FIG. 2 is a block diagram of a computing system for correcting a measured formation signal while drilling using a machine learning algorithm according to one example of the present disclosure.

FIG. 2 is a block diagram of a computing system 200 for correcting a measured formation signal while drilling, using a machine learning algorithm according to one example of the present disclosure. The system 200 includes the computing device 140. The computing device 140 can include a processor 204, a memory 207, and a bus 206. The processor 204 can execute one or more operations for correcting measured signals using a trained machine-learning model 212 or other type of machine-learning process. The processor 204 can execute instructions stored in the memory 207 to perform the operations. The processor 204 can include one processing device or multiple processing devices or cores. Non-limiting examples of the processor 204 include a Field-Programmable Gate Array ("FPGA"), an application-specific integrated circuit ("ASIC"), a microprocessor, etc.

The processor 204 can be communicatively coupled to the memory 207 via the bus 206. The non-volatile memory 207 may include any type of memory device that retains stored information when powered off. Non-limiting examples of the memory 207 include EEPROM, flash memory, or any other type of non-volatile memory. In some examples, at least part of the memory 207 can include a medium from which the processor 204 can read instructions. A computer-readable medium can include electronic, optical, magnetic, or other storage devices capable of providing the processor 204 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language, including, for example, C, C++, C #, etc.

In some examples, the memory 207 can include computer program instructions 210 for applying a trained machine-learning model 212 for determining a coupling factor (i.e., alpha) included in a measured signal and generating a corrected signal with reduced or removed noise, using the determined coupling factor. The corrected signal can be stored in the memory 207, or transmitted to another computing device, for use in analyzing the formation and controlling the drilling operation.

The system 200 can include a power source 220. The power source 220 can be in electrical communication with the computing device 140 and the communications device 144. In some examples, the power source 220 can include a battery or an electrical cable (e.g., a wireline). In some examples, the power source 220 can include an AC signal generator. The computing device 140 can operate the power source 220 to apply a transmission signal to the antenna 228 to forward data relating to formation parameters, connections, etc. to other systems. For example, the computing device 140 can cause the power source 220 to apply a voltage with a frequency within a specific frequency range to the antenna 228. This can cause the antenna 228 to generate a wireless transmission. In other examples, the computing device 140, rather than the power source 220, can apply the transmission signal to the antenna 228 for generating the wireless transmission.

In some examples, part of the communications device 144 can be implemented in software. For example, the communications device 144 can include additional instructions stored in memory 207 for controlling functions of the communication device 144. The communications device 144 can receive signals from remote devices and transmit data to remote devices. For example, the communications device 144 can transmit wireless communications that are modulated by data via the antenna 228.

The computing system 200 can receive input, such as measured signals, from sensor(s) 109. The computing system 200 in this example also includes input/output interface 232. Input/output interface 232 can couple to a keyboard, pointing device, display, and other computer input/output devices. An operator may provide input using the input/output interface 232. The can be included in a display that is outputted via the input/output interface 232.

In some examples, the components shown in FIG. 2 (e.g., the computing device 140, power source 220, and communications device 144) can be integrated into a single structure. For example, the components can be within a single housing. In other examples, the components shown in FIG. 2 can be distributed (e.g., in separate housings) and in electrical communication with each other, such as in a cloud formation.

Figure 3:
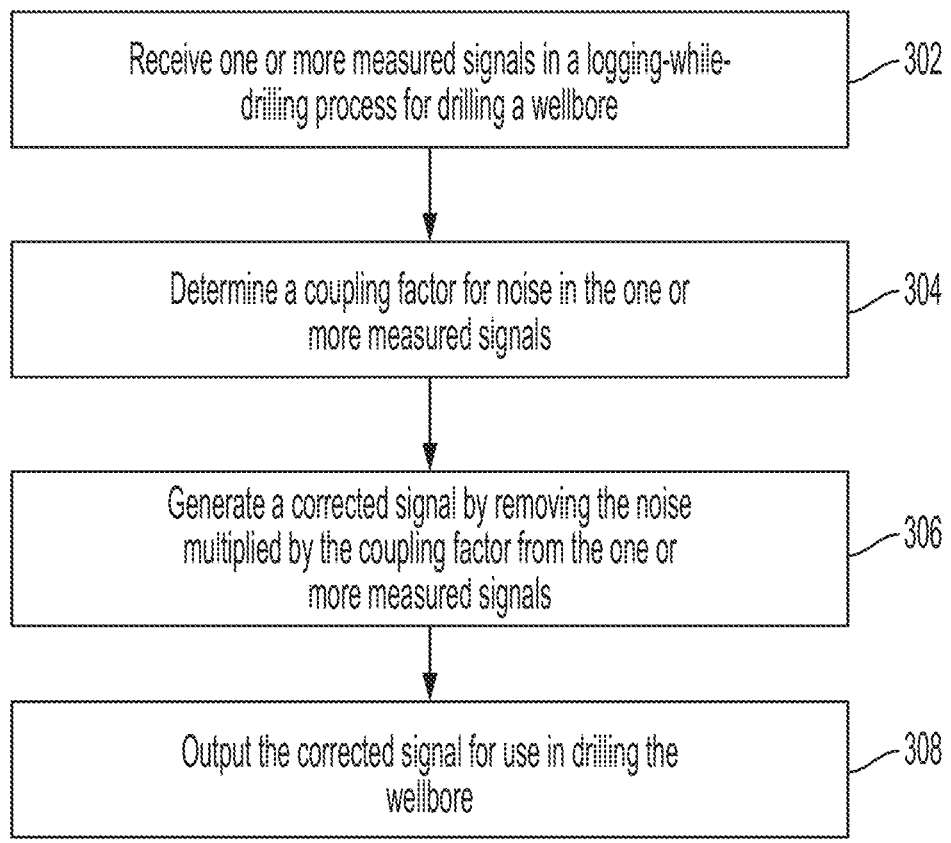
FIG. 3 is a flow chart for determining a corrected signal with reduced or eliminated noise using a machine-learning algorithm according to one example of the present disclosure.

FIG. 3 is a flow chart for determining a corrected signal with reduced or eliminated noise using a machine-learning algorithm according to one example.

In some examples, a processor, such as the processor 204 in FIG. 2, can perform the operations of the flow chart. Other examples can involve more operations, fewer operations, different operations, or a different order of the operations shown in FIG. 3. In the example of FIG. 3, the noise to be removed from the measured signal is vibration-related noise, but the process outlined in FIG. 3 can be applied to other types of noise in addition to, or instead of, vibration-related noise.

At block 302, the processor 204 can receive one or more measured signals in a logging-while-drilling process for drilling a wellbore. For example, the measured signals may be from an NMR sensor 109 in a BHA 104 of a drilling arrangement and the signals can be received via a wireline communication medium by a surface communication device, which may be, or be included in, a computing device 140. The measured signals can include data representing a formation signal with information about formation properties, as well as a noise signal. The noise signal may be a vibration-related signal, multiplied by a coupling factor. Additionally or alternatively, the noise signal may be a motion-related signal, multiplied by a coupling factor.

In some examples, the one or more measured signals may be in a time domain format. The processor 204 may invert the measured signals to change the measured signals form a time domain format to a spectrum domain format. For example, a spectrum for the measured signal may include multiple bin values. In one particular example, the spectrum may include 54 bin values.

At block 304, the processor 204 can determine a coupling factor for noise in the one or more measured signals. In some examples, the processor 202 can generate a trained machine-learning model 212 for determining a coupling factor for noise in the measured signal. The trained machine-learning model 212 can be generated using data from prior-drilled wells with formation data known, or via signals that are artificially generated with known noise and formation information. The data can be used to train a model to learn the factors and weights associated with determining a coupling factor for noise in measured signals.

In some examples where the noise signal is a vibration-related signal, the coupling factor can be determined via a machine-learning model 212 using acceleration data for vibration-related noise or stick-slip data for motion-related noise. The acceleration data may be measured by an accelerometer downhole in the wellbore 118. The stick-slip measurement data may be measured by a sensor 109 downhole in the wellbore 118. The processor 204 can use the machine-learning model 212 to determine a correlation between (1) the measured signal, minus the coupling factor multiplied by a noise signal (which is represented by the acceleration data or the stick-slip data), and (2) the noise signal. A relatively high correlation may indicate that the measured signal is contaminated by the noise signal. The processor 204 can set the correlation to zero to determine the coupling factor for use in reducing or eliminating the noise signal in the measured signal.

If the measured signal is in a spectrum domain format, the processor 204 may use the machine-learning model 212 to determine the correlation and coupling factor using each bin for the spectrum. For example, if the spectrum includes 54 bins, the processor 204 may determine a coupling factor for each bin, and may then determine an overall coupling factor based on the coupling factor for each bin. In some examples, the processor 204 may determine bins that are principal components of the spectrum. The processor 204 may determine the overall coupling factor using the coupling factors determined only for the bins that are principal components of the spectrum. For example, the overall coupling factor may be an average of the coupling factors for the principal components.

At block 306, the processor generates a corrected signal by removing the noise multiplied by the coupling factor from the measured signal. For example, the processor can use signal and data processing techniques to subtract or remove noise, such as motion noise or vibration noise, with the coupling factor from the measured signal. At block 308, the processor outputs the vibration-corrected signal for use in the drilling operation. For example, the vibration-corrected signal can be analyzed to determine one or more formation properties that are used in making decisions on controlling the drilling operation.

Although the process of FIG. 3 is described with respect to measured signals acquired in a logging-while-drilling process, the process can also be applied to stationary data that is acquired while drilling pipes are changes to remove noise in signals representing the stationary data.

Figure 4:
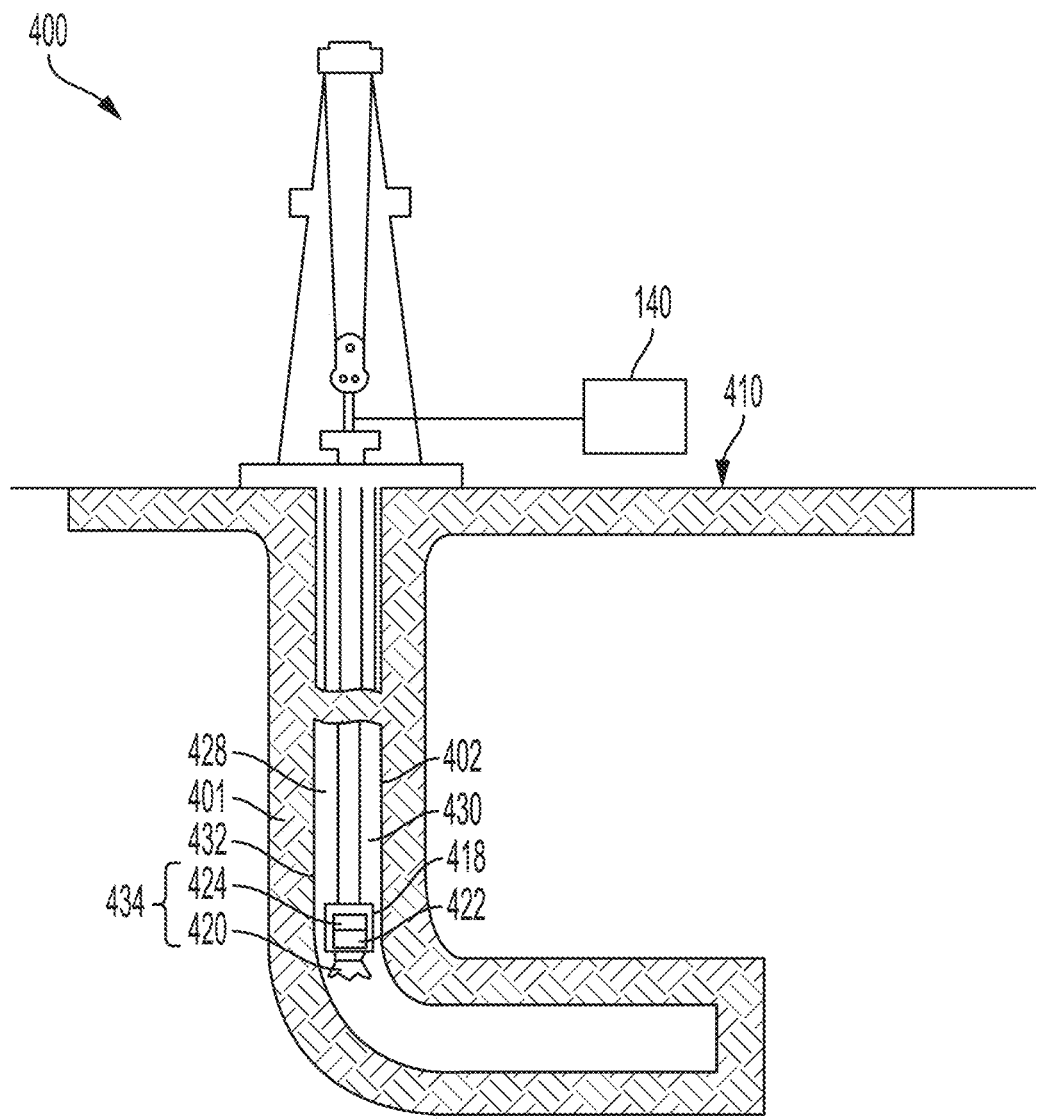
FIG. 4 is a cross-sectional view of a drilling rig for drilling a wellbore into a subterranean formation and of a computing device that can correct measured signals to remove noise, according to one example of the present disclosure.

FIG. 4 is a schematic diagram of a drilling rig 400 for drilling a wellbore 402 into a subterranean formation 401 and of a computing device 140 that can correct measured signals to remove noise, according to one example of the present disclosure.

In this example, drilling rig 400 is depicted for a well, such as an oil or gas well, for extracting fluids from a subterranean formation 401. The drilling rig 400 may be used to create a wellbore 402 from a surface 410 of the subterranean formation 401. The drilling rig 400 may include a well tool or downhole tool 418, and a drill bit 420. The downhole tool 418 can be any tool used to gather information about the wellbore 402. For example, the downhole tool 418 can be a tool used for measuring-while-drilling or logging-while-drilling operations. The downhole tool 418 can include a sensor component 422, such as an NMR sensor, for determining information about the wellbore 402 in a logging-while-drilling process. Surface measurements may also be made during the drilling operation. Examples of surface measurements can include rate of penetration, weight on bit, standpipe pressure, depth, mud flow in, rotations per minute, torque, or other parameters. The downhole tool 418 can also include a transmitter 424 for transmitting data from the sensor component 422 to the surface 410. A bottom hole assembly 434 can include the downhole tool 418 and the drill bit 420 for drilling the wellbore 402.

The wellbore 402 is shown as being drilled from the surface 410 and through the subterranean formation 401. As the wellbore 402 is drilled, drilling fluid can be pumped through the drill bit 420 and into the wellbore 402 to enhance drilling operations. As the drilling fluid enters into the wellbore, the drilling fluid circulates back toward the surface 410 through a wellbore annulus 428, which is an area between a drill string 430 and a wall 432 of the wellbore 402.

Also included in the schematic diagram is the computing device 140. The computing device 140 can be communicatively coupled to the downhole tool 418 and receive real-time information about the drilling operation. The computing device 140 can apply a trained machine-learning model 212 for determining a coupling factor (i.e., alpha) included in a measured signal and can generate a corrected signal with reduced or removed noise, using the determined coupling factor.

Figure 5:
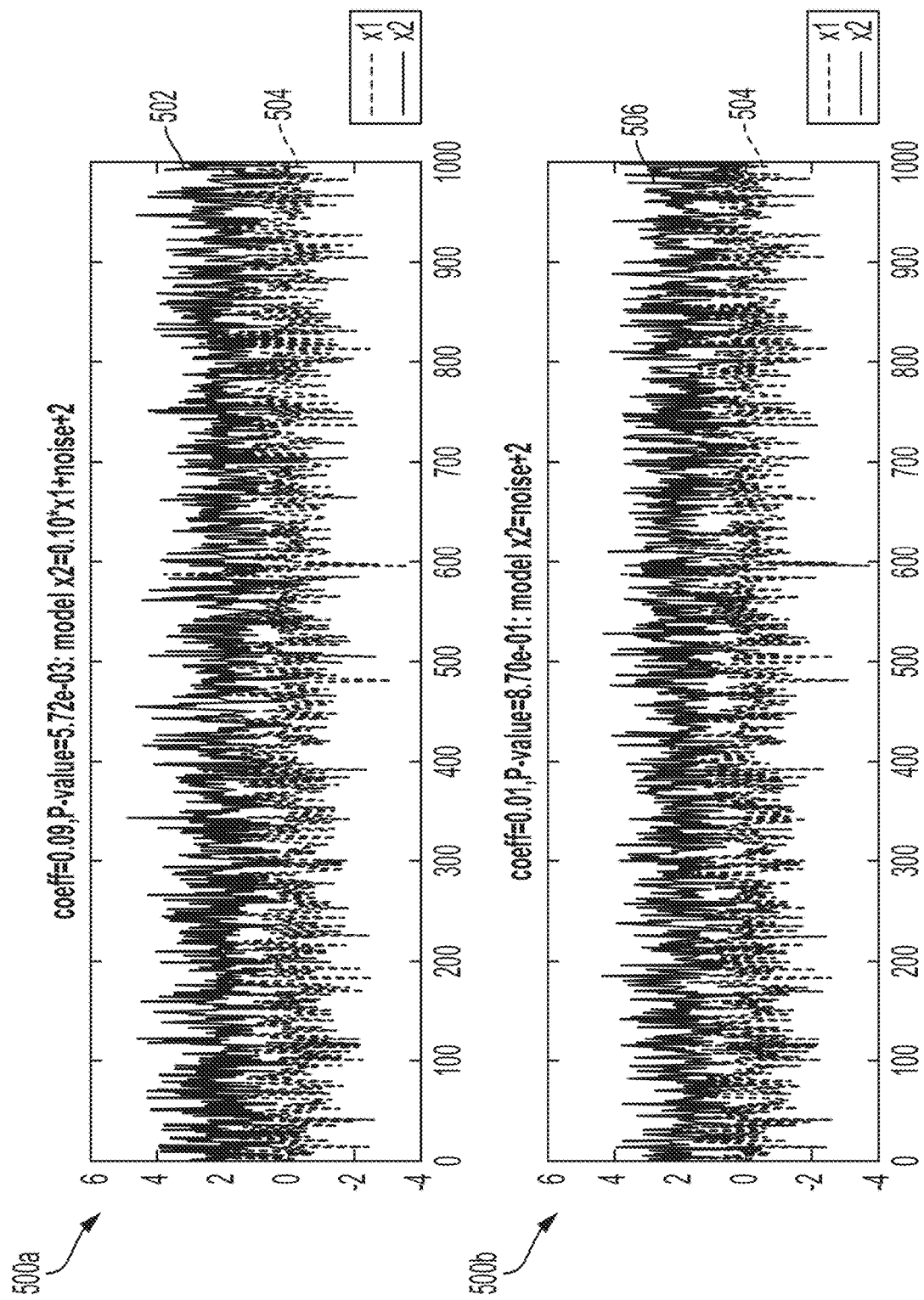
FIG. 5 is a pair of graph depicting measured signals with noise, according to one example of the present disclosure.

FIG. 5 is a pair of graphs 500a-b depicting measured signals with noise according to one example of the present disclosure. In graph 500a, measured signal 502 (e.g., x2) may be a measured signal including a formation signal and a noise signal 504 that is also depicted on graph 500a. Noise signal 504 may be a motion noise or a vibration noise. The processor 204 of FIG. 2 may utilize the trained machine-learning model 212 to determine a coupling factor (e.g., alpha) for the noise signal 504 by setting a correlation between (1) the noise signal 504 and (2) the measured signal 502 minus alpha multiplied by the noise signal 504 to zero. In this example, alpha is depicted in graph 500a as 0.09. The p-value for the correlation between the measured signal 502 and the noise signal 504 is $5.72*10^{-3}$, which may indicate a strong correlation and a high contamination from the noise signal 504 in measured signal 502.

The processor 204 may determine a corrected formation signal 506 by subtracting the noise signal 504 multiplied by alpha from the measured signal 502. Graph 500b depicts the formation signal 506 and the noise signal 504. The p-value for the correlation between the formation signal 506 and the noise signal 504 is 0.87, which may indicate a weak correlation between the formation signal 506 and the noise signal 504. Therefore, the noise signal 504 may be successfully reduced or eliminated from the measured signal 502. The processor 204 may output the formation signal 506 to be used in a drilling operation.

In some aspects, systems, methods, and computer-readable mediums for using machine learning to eliminate or reduce noise in drilling operation measurements are provided according to one or more of the following examples:

Example #1

A system may feature a processor and a memory that includes instructions executable by the processor for causing the processor to: receive one or more measured signals in a logging-while-drilling process for drilling a wellbore; determine a coupling factor for noise in the one or more measured signals; generate a corrected signal by removing the noise multiplied by the coupling factor from the one or more measured signals; and output the corrected signal for use in drilling operations in the wellbore.

Example #2

The system of Example #1 may feature the memory further including instructions executable by the processor to: generate a trained machine-learning model for determining the coupling factor for noise in the one or more measured signals by training a model with measured signals from previous logging-while-drilling processes.

Example #3

The system of any of Examples #1-2 may feature the memory further including instructions executable by the processor to determine the coupling factor by: determining, using the trained machine-learning model, a plurality of principal components in the one or more measured signals; determining, using the trained machine-learning model, a principal component coupling factor for each principal component of the plurality of principal components; and determining, using the trained machine-learning model, the coupling factor based on the principal component coupling factors.

Example #4

The system of any of Examples #1-3 may feature the memory further including instructions executable by the processor for determining the coupling factor for noise in the one or more measured signals by determining a correlation between the one or more measured signals and a result of subtracting the coupling factor multiplied by the one or more measured signals.

Example #5

The system of any of Examples #1-4 may feature the one or more measured signals including data from a nuclear magnetic resonance sensor in a bottom-hole assembly of a drilling system.

Example #6

The system of any of Examples #1-5 may feature the memory further including instructions executable by the processor for determining the coupling factor for noise in the one or more measured signals by using acceleration data representing a vibration signal for vibration-related noise.

Example #7

The system of any of Examples #1-6 may feature the memory further including instructions executable by the processor for determining the coupling factor for noise in the one or more measured signals by using stick-slip measurement data representing a motion signal for motion-related noise.

Example #8

A method can include receiving, by a processor, one or more measured signals in a logging-while-drilling process for drilling a wellbore; determining, by the processor, a coupling factor for noise in the one or more measured signals; generating, by the processor, a corrected signal by removing the noise multiplied by the coupling factor from the one or more measured signals; and outputting, by the processor, the corrected signal for use in drilling operations in the wellbore.

Example #9

The method of Example #8 can include generating a trained machine-learning model for determining the coupling factor for noise in the one or more measured signals by training a model with measured signals from previous logging-while-drilling processes.

Example #10

The method of any of Examples #8-9 may feature determining the coupling factor by: determining, using the trained machine-learning model, a plurality of principal components in the one or more measured signals; determining, using the trained machine-learning model, a principal component coupling factor for each principal component of the plurality of principal components; and determining, using the trained machine-learning model, the coupling factor based on the principal component coupling factors.

Example #11

The method of any of Examples #8-10 may feature determining the coupling factor by determining a correlation between the one or more measured signals and a result of subtracting the coupling factor multiplied by the one or more measured signals.

Example #12

The method of any of Examples #8-11 may feature the one or more measured signals including data from a nuclear magnetic resonance sensor in a bottom-hole assembly of a drilling system.

Example #13

The method of any of Examples #8-12 may feature determining the coupling factor for noise in the one or more measured signals by using acceleration data representing a vibration signal for vibration-related noise.

Example #14

The method of any of Examples #8-13 may feature determining the coupling factor for noise in the one or more measured signals by using stick-slip measurement data representing a motion signal for motion-related noise.

Example #15

A non-transitory computer-readable medium may feature instructions that are executable by a processor for causing the processor to: receiving one or more measured signals in a logging-while-drilling process for drilling a wellbore; determining a coupling factor for noise in the one or more measured signals; generating a corrected signal by removing the noise multiplied by the coupling factor from the one or more measured signals; and outputting the corrected signal for use in drilling operations the wellbore.

Example #16

The non-transitory computer-readable medium of Example #15 may feature instructions that are executable by the processor for causing the processor to: generate a trained machine-learning model for determining the coupling factor for noise in the one or more measured signals by training a model with measured signals from previous logging-while-drilling processes.

Example #17

The non-transitory computer-readable medium of any of Examples #15-16 may feature instructions that are executable by the processor for causing the processor to determine the coupling factor by: determining, using the trained machine-learning model, a plurality of principal components in the one or more measured signals; determining, using the trained machine-learning model, a principal component coupling factor for each principal component of the plurality of principal components; and determining, using the trained machine-learning model, the coupling factor based on the principal component coupling factors.

Example #18

The non-transitory computer-readable medium of any of Examples #15-17 may feature instructions that are executable by the processor for causing the processor to determine the coupling factor for noise in the one or more measured signals by: determining a correlation between the one or more measured signals and a result of subtracting the coupling factor multiplied by the one or more measured signals.

Example #19

The non-transitory computer-readable medium of any of claims #15-18 can include the one or more measured signals including data from a nuclear magnetic resonance sensor in a bottom-hole assembly of a drilling system.

Example #20

The non-transitory computer-readable medium of any of claims #15-19 may feature instructions that are executable by the processor for causing the processor to determine the coupling factor for noise in the one or more measured signals by using acceleration data representing a vibration signal for vibration-related noise.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processor; and
a memory that includes instructions executable by the processor for causing the processor to:
receive one or more measured signals in a logging-while-drilling process for drilling a wellbore, the one or more measured signals comprising noise that includes at least one of vibration-related noise or motion-related noise, wherein the one or more measured signals are in a spectrum domain format comprising a plurality of bin values;
determine a coupling factor for noise for each bin value of the plurality of bin values using a machine learning process;
determine an overall coupling factor for noise in the one or more measured signals based on the coupling factor for each bin value of the plurality of bin values, wherein the overall coupling factor is a variable;
generate a corrected signal by removing the noise multiplied by the overall coupling factor from the one or more measured signals; and
control a drilling operation in the wellbore based on the corrected signal.

2. The system of claim 1, wherein the memory further includes instructions executable by the processor to:
generate a trained machine-learning model for determining the coupling factor for noise in the one or more measured signals by training a model with measured signals from previous logging-while-drilling processes.

3. The system of claim 1, wherein the memory further includes instructions executable by the processor to determine the overall coupling factor by:
determining, using a trained machine-learning model, a plurality of principal components in the plurality of bin values;
determining, using the trained machine-learning model, a principal component coupling factor for each principal component of the plurality of principal components; and
determining, using the trained machine-learning model, the overall coupling factor based on the principal component coupling factors.

4. The system of claim 1, wherein the memory further includes instructions executable by the processor for determining the overall coupling factor for noise in the one or more measured signals by determining a correlation between the one or more measured signals and a result of subtracting the overall coupling factor multiplied by the one or more measured signals.

5. The system of claim 1, wherein the one or more measured signals include data from a nuclear magnetic resonance sensor in a bottom-hole assembly of a drilling system.

6. The system of claim 1, wherein the memory further includes instructions executable by the processor for determining the overall coupling factor for noise in the one or more measured signals by using acceleration data representing a vibration signal for the vibration-related noise.

7. The system of claim 1, wherein the memory further includes instructions executable by the processor for determining the overall coupling factor for noise in the one or more measured signals by using stick-slip measurement data representing a motion signal for the motion-related noise.

8. A method comprising:
receiving, by a processor, one or more measured signals in a logging-while-drilling process for drilling a wellbore, the one or more measured signals comprising noise that includes at least one of vibration-related noise or motion-related noise, wherein the one or more measured signals are in a spectrum domain format comprising a plurality of bin values;
determine, by the processor, a coupling factor for noise for each bin value of the plurality of bin values using a machine learning process;
determining, by the processor, an overall coupling factor for noise in the one or more measured signals based on the coupling factor for each bin value of the plurality of bin values, wherein the overall coupling factor is a variable;
generating, by the processor, a corrected signal by removing the noise multiplied by the overall coupling factor from the one or more measured signals; and
control a drilling operation in the wellbore based on the corrected signal.

9. The method of claim 8, further comprising:
generating a trained machine-learning model for determining the coupling factor for noise in the one or more measured signals by training a model with measured signals from previous logging-while-drilling processes.

10. The method of claim 8, wherein determining the overall coupling factor further comprises:
determining, using a trained machine-learning model, a plurality of principal components in the plurality of bin values;
determining, using the trained machine-learning model, a principal component coupling factor for each principal component of the plurality of principal components; and
determining, using the trained machine-learning model, the overall coupling factor based on the principal component coupling factors.

11. The method of claim 8, wherein determining the overall coupling factor further comprises:
determining a correlation between the one or more measured signals and a result of subtracting the overall coupling factor multiplied by the one or more measured signals.

12. The method of claim 8, wherein the one or more measured signals include data from a nuclear magnetic resonance sensor in a bottom-hole assembly of a drilling system.

13. The method of claim 8, further comprising determining the overall coupling factor for noise in the one or more measured signals by using acceleration data representing a vibration signal for the vibration-related noise.

14. The method of claim 8, further comprising determining the overall coupling factor for noise in the one or more measured signals by using stick-slip measurement data representing a motion signal for the motion-related noise.

15. A non-transitory computer-readable medium comprising instructions that are executable by a processor for causing the processor to perform operations comprising:

receiving one or more measured signals in a logging-while-drilling process for drilling a wellbore, the one or more measured signals comprising noise that includes at least one of vibration-related noise or motion-related noise, wherein the one or more measured signals are in a spectrum domain format comprising a plurality of bin values;
    determine a coupling factor for noise for each bin value of the plurality of bin values using a machine learning process;
determining an overall coupling factor for noise in the one or more measured signals based on the coupling factor for each bin value of the plurality of bin values, wherein the overall coupling factor is a variable;
generating a corrected signal by removing the noise multiplied by the overall coupling factor from the one or more measured signals; and
control a drilling operation in the wellbore based on the corrected signal.

16. The non-transitory computer-readable medium of claim 15, further comprising instructions that are executable by the processor for causing the processor to:
    generate a trained machine-learning model for determining the coupling factor for noise in the one or more measured signals by training a model with measured signals from previous logging-while-drilling processes.

17. The non-transitory computer-readable medium of claim 15, further comprising instructions that are executable by the processor for causing the processor to determine the overall coupling factor by:
    determining, using a trained machine-learning model, a plurality of principal components in the plurality of bin values;
    determining, using the trained machine-learning model, a principal component coupling factor for each principal component of the plurality of principal components; and
    determining, using the trained machine-learning model, the overall coupling factor based on the principal component coupling factors.

18. The non-transitory computer-readable medium of claim 15, further comprising instructions that are executable by the processor for causing the processor to determine the overall coupling factor for noise in the one or more measured signals by:
    determining a correlation between the one or more measured signals and a result of subtracting the overall coupling factor multiplied by the one or more measured signals.

19. The non-transitory computer-readable medium of claim 15, wherein the one or more measured signals include data from a nuclear magnetic resonance sensor in a bottom-hole assembly of a drilling system.

20. The non-transitory computer-readable medium of claim 15, further comprising instructions that are executable by the processor for causing the processor to determine the overall coupling factor for noise in the one or more measured signals by using acceleration data representing a vibration signal for the vibration-related noise.

* * * * *